United States Patent
Karlsson et al.

(10) Patent No.: US 8,674,240 B2
(45) Date of Patent: Mar. 18, 2014

(54) TRANSITION FRAME WITH INTEGRATED COMPRESSION UNIT

(75) Inventors: Andreas Karlsson, Karlskrona (SE); Stefan Milton, Ramdala (SE)

(73) Assignee: Roxtec AB, Karlskrona (SE)

(*) Notice: Subject to any disclaimer, the term of this patent is extended or adjusted under 35 U.S.C. 154(b) by 186 days.

(21) Appl. No.: 12/735,623

(22) PCT Filed: Jan. 21, 2009

(86) PCT No.: PCT/SE2009/050059
§ 371 (c)(1), (2), (4) Date: Aug. 26, 2010

(87) PCT Pub. No.: WO2009/102262
PCT Pub. Date: Aug. 20, 2009

(65) Prior Publication Data
US 2010/0326724 A1    Dec. 30, 2010

(30) Foreign Application Priority Data
Feb. 15, 2008    (SE) .................................. 0800348-5

(51) Int. Cl.
*H02G 3/22* (2006.01)
*B23P 17/04* (2006.01)

(52) U.S. Cl.
USPC ............. 174/657; 174/652; 174/656; 248/56

(58) Field of Classification Search
USPC ............................ 174/652, 656, 657; 248/56
See application file for complete search history.

(56) References Cited

U.S. PATENT DOCUMENTS

| 2,674,772 A | | 4/1954 | Jacobs | |
| 2,732,226 A | * | 1/1956 | Brattberg | 285/192 |
| 3,282,544 A | | 11/1966 | Brattberg | |
| 4,677,253 A | * | 6/1987 | Blomqvist | 174/362 |
| 4,733,016 A | * | 3/1988 | Twist et al. | 174/657 |
| 5,416,271 A | * | 5/1995 | Birmingham et al. | 174/657 |
| 5,938,152 A | * | 8/1999 | Kreutz | 248/56 |
| 7,446,267 B2 | * | 11/2008 | Hedstrom | 174/650 |
| 2009/0126992 A1 | * | 5/2009 | Horn | 174/656 |

FOREIGN PATENT DOCUMENTS

| DE | 8807280 | 9/1988 |
| DE | 4340343 | 3/1995 |
| SE | 414439 | 7/1980 |

* cited by examiner

*Primary Examiner* — William H Mayo, III
*Assistant Examiner* — Hiram E Gonzalez
(74) *Attorney, Agent, or Firm* — Harness, Dickey & Pierce, P.L.C.

(57) ABSTRACT

A frame for receiving one or more modules for cable entries or pipe penetrations. A compression unit is an integrated part of the frame in at least one embodiment, which compression unit is to compress the modules inside the frame. The compression unit includes three compression wedges. An upper and a lower compression wedge have the same orientation, while a middle compression wedge has an opposite orientation. The middle compression wedge is oriented with a broad side facing an opening of the frame receiving the modules. At least one compression screw goes through openings of the upper and lower compression wedges and through a slot in the middle compression wedge.

15 Claims, 3 Drawing Sheets

TRANSITION FRAME WITH INTEGRATED COMPRESSION UNIT

TECHNICAL FIELD

The present invention concerns a frame receiving modules for cable entries or pipe penetration. One or more compression units are integrated parts of the frame.

PRIOR ART

In the prior art there are cable transitions or the like having a frame, inside which a number of modules to receive cables, wires or pipes are placed. The modules are made of an elastic material e.g. rubber or plastics and are thus compressible. Inside the frame normally a number of modules are received side by side in one or more rows together with some kind of compression unit. The compression unit is placed between the frame and the modules in such a way that when the compression unit is expanded the compressible modules will be compressed around the cables, wires or pipes. Normally, the compression units used in cable or pipe transitions are self-contained units to be placed inside the frame together with the modules for receiving single cables or pipes.

Cable transitions are used for sealing in many different environments, such as for cabinets, technical shelters, junction boxes and machines. They are used in different industrial environments, such as automotive, telecom, power generation and distribution, as well as marine and offshore. The modules may have to seal against fluid, gas, fire, rodents, termites, dust, moisture etc., and may receive cables for electricity, communication, computers etc. or pipes for different gases or liquids such as water, compressed air, hydraulic fluid and cooking gas.

SUMMARY OF THE INVENTION

By integrating the compression unit or units in the frame the number of lose parts to be mounted inside the frame is reduced.

A general strive is to make transitions of this kind less complicated regarding manufacture, handling and storing. One object of the present invention is to integrate the compression unit in the frame. Thereby handling is facilitated. Furthermore, it would be beneficial if the compression unit were manufacture in the same procedure step as the rest of the frame. The manufacture may also include a seal, which seal is to be placed abutting a partition at which the frame is mounted.

A further object of the present invention is to form compression units having relatively low complexity.

The above objects are met by a transition frame having an opening receiving one or more modules and wherein a compression unit is an integrated part of the frame. The transition frame forms a transition for cables or pipes together with the modules. The frame and integrated compression unit are made in a common process step.

Further objects and advantages of the present invention will be obvious to a person skilled in the art when reading the detailed description below of at present preferred embodiments.

BRIEF DESCRIPTION OF THE DRAWINGS

The invention will be described further below by way of example and with reference to the enclosed drawings. In the drawings.

DETAILED DESCRIPTIONS OF PREFERRED EMBODIMENTS

Figure 1:
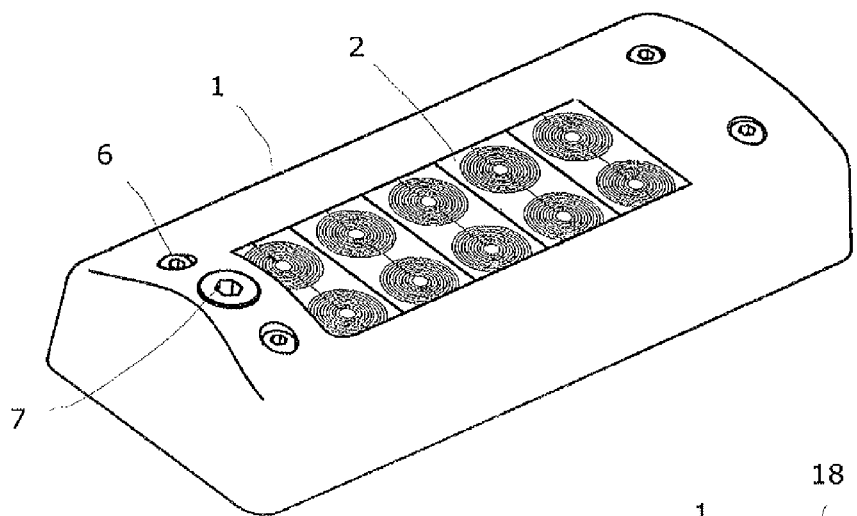
FIG. 1 is a perspective view of a first example of a frame according to the present invention.
Figure 2:
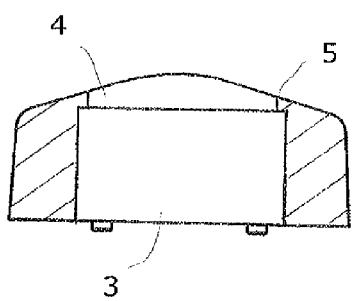
FIG. 2 is a cross section view of the frame of FIG. 1 with parts taken away for clarity.
Figure 3:
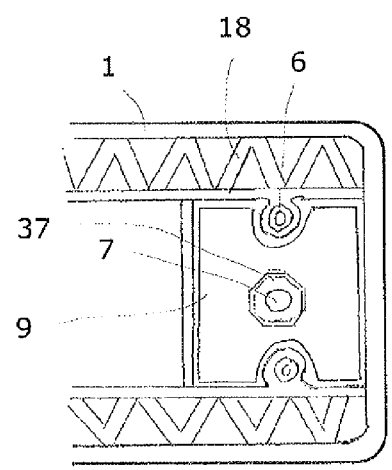
FIG. 3 is a bottom view of a part of the frame including the compression unit.
Figure 4:
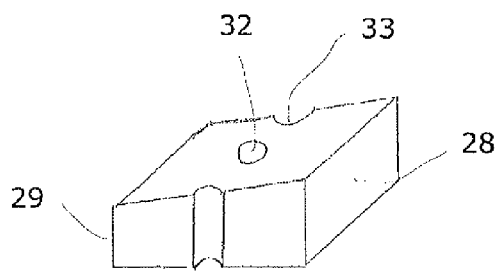
FIG. 4 is a perspective view of one element of a compression unit of the present invention.
Figure 5:
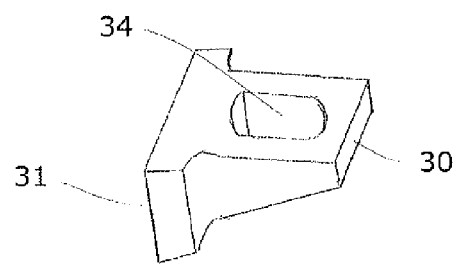
FIG. 5 is a perspective view of another element of the compression unit of the present invention.
Figure 7:
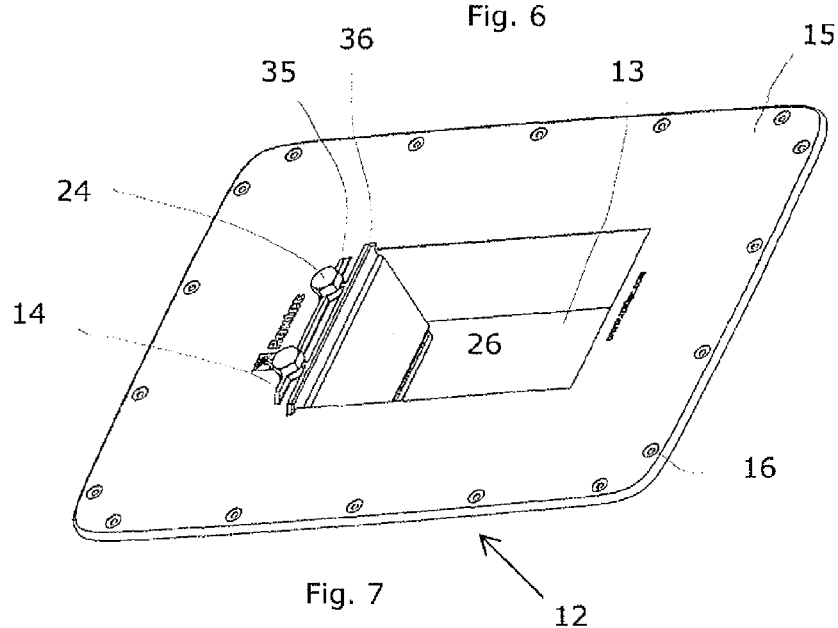
FIG. 7 is an upper perspective view of a further example of a frame according to the present invention.

As used in this description "upper", "lower" and similar expressions refer to directions in view of the frames having the orientation as showed in FIGS. 1, 2 and 7.

In FIG. 1 a first example of a frame 1 according to the present invention is showed, which frame 1 is intended to be received in an opening of a wall, a roof, a floor or a bottom of a house, a ship, an electrical cabinet, a container etc. The wall, roof, floor or bottom could be expressed as any dividing structure or partition. The frame forms a transition for cables and/or pipes together with modules received in the frame 1.

In the frame 1 a number of modules 2 are received. The modules 2 are placed inside an opening 3 of the frame. The modules 2 are to receive pipes or cables. The modules 2 have a number of peelable sheets to adapt an inner diameter to the outer diameter of the received cable or pipe.

To keep the modules 2 in place inside the frame 1 an edge 5 is arranged at the upper end of the opening 3 receiving the modules 2, whereby the opening 3 transforms into a smaller opening 4 above the edge 5. The edge 5 goes all around the upper end of the opening. Thus, the modules 2 are normally inserted in the opening 3 from below. The frame 1 can be mounted to a partition by means of screws 6 or other suitable fastening means.

A compression unit 8 forms an integrated part of the frame 1. The compression unit 8 is placed in a space at one end of the frame 1, which space is open downwards and towards the opening 3 of the frame 1. The upper part of the space is covered for retaining the compression unit in the space. Thus, by means of the compression unit 8 a tight seal of each cable and/or pipe is established. The compression unit 8 comprises three main elements each having a wedge form. Of the three elements a lower compression wedge 9 and an upper compression wedge 10 have the same orientation, while a middle compression wedge 11 has a reverse orientation. The lower and upper compression wedges 9, 10 have one slanted surface each to be facing the middle compression wedge 11. The surface opposite the slanted surface of each lower and upper compression wedges 9, 10, respectively, is not slanted. In practice the lower and upper compression wedges 9, 10 are almost identical. However, they may have different thickness, in order for the middle compression wedge 11 to be placed in a proper position in relation to the modules 2. Furthermore, one of the upper and lower compression wedges 9, 10 normally has a recess receiving a nut 37 co-operating with a compression screw 7. When placed in the compression unit 8 the slanted surface of the lower compression wedge 9 is facing upwards while the slanting surface of the upper compression wedge 10 is facing downwards. Seen in cross section a broad side 31 of the middle compression wedge 11 is facing the opening 3 of the frame 1, while broad sides 28 of the lower and upper compression wedges 9, 10 are facing a wall of the frame 1 opposite the opening 3 of the frame 1. Thus, small sides 29 of the lower and upper compression wedges 9, 10 and the broad side 31 of the middle compression wedge 11 are facing the opening 3 of the frame 1. Correspondingly the broad sides 28 of the lower and upper compression wedges 9, 10 and a small side 30 of the middle compression wedge 11 are facing a wall of the frame 1. The compression screw 7 is received in the middle of the compression wedges 9-11.

In the lower and upper compression wedges 9, 10 the compression screw 7 is received in a circular opening 32 adapted to the size of the screw 7. In the middle compression wedge 11 the compression screw 7 is received inside a slot 34, giving the middle compression wedge 11 a possibility to slide in relation to the compression screw 7 and in relation to the lower and upper compression wedges 9, 10. A nut 37 is received at one end of the compression screw 7, which nut 37 is received in a recess of the lower compression wedge 9. The recess is formed after the nut 37 to assist in tightening of the compression screw 7 by hindering the nut 37 from rotating. Furthermore the screws 6 for fixating the frame to a wall or the like are received in recesses 33 at opposite sides of the lower and upper compression wedges 9, 10. In the shown embodiment sleeves receiving the screws 6 are arranged in the frame, which sleeves form through openings for the screws 6. In this case the sleeves are received in the recesses 33 of the lower and upper compression wedges 9, 10. By placing the fastening means in recesses of the lower and upper compression wedges 9, 10, these compression wedges 9, 10 will have a stabilized position. Thereby, the lower and upper compression wedges 9, 10 will only be free to move upwards and downwards depending on the movement of the compression screw 7.

The middle compression wedge 11 is less wide at the portion of the wedge including the slot 34 compared to the portion at the broad side 31. The portion having less width should be small enough to pass between the screws 6 used for fastening the frame 1. Thus, the middle compression wedge 11 is free to move in horizontal direction between the screws 6.

Figure 6:
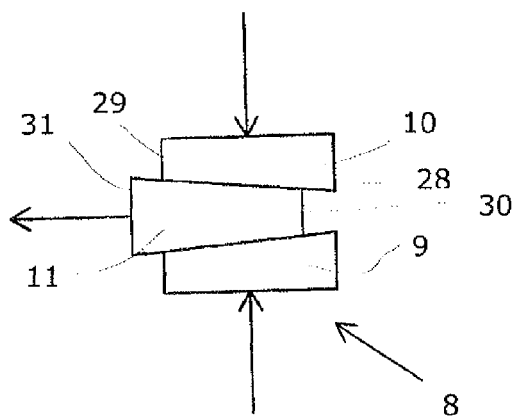
FIG. 6 is an illustrative sketch showing the function of a compression unit of the present invention.

The function of the compression unit 8 is indicted in FIG. 6. As the compression screw 7 is tightened by means of the nut at one end the lower and upper compression wedges 9, 10 will be pressed towards each other, as indicated by the vertical arrows in FIG. 6. By means of the slanting surfaces of the compression wedges 9-11, the middle compression wedge 11 will be moved in the direction of the horizontal arrow of FIG. 6 when the lower and upper compression wedges 9, 10 are pressed towards each other. The middle compression wedge 11 is free to move in a horizontal direction thanks to the slot receiving the compression screw 7 and to the portion of the middle compression wedge 11 having a width that is smaller than the distance between the fixation means of the frame 1. The middle wedge 11 will move towards and compress the modules 2 inside the opening 3 of the frame 1.

In one embodiment the lower and upper compression wedges 9, 10 are made of a plastic material, such as PA 66, 306F or similar, while the middle compression wedge 11 is made of a rubber material, such as EPDM, Roxylon or similar. Normally a lubricant is placed on the slanting contact surfaces of the compression wedges 9-11.

Figure 8:
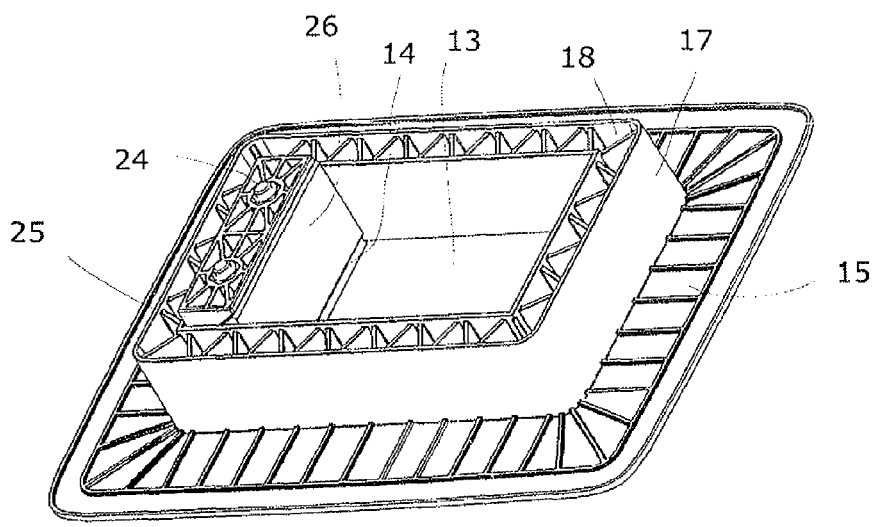
FIG. 8 is a lower perspective view of the frame of FIG. 7.
Figure 9:
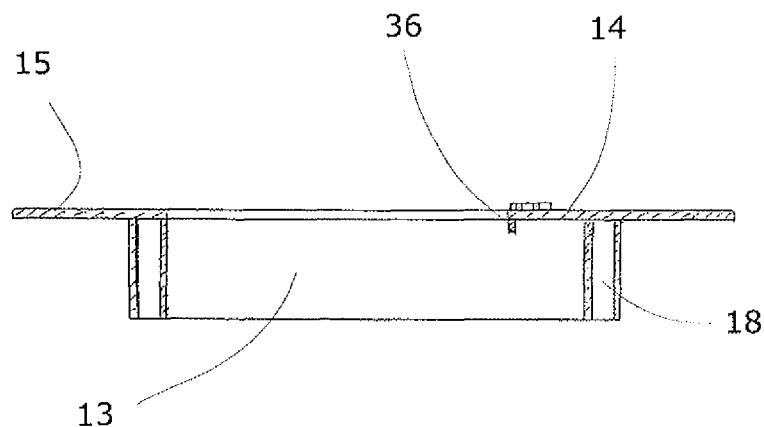
FIG. 9 is a cross section view of a part of the frame of FIGS. 7 and 8.

In FIGS. 7-9 a further example of a frame 12 according to the present invention having an integrated compression unit is shown. The compression unit has the same general structure as for the compression unit 8 of the frame 1 of FIGS. 1-4 and, thus, will not be described extensively here. However, in this case the compression unit has two compression screws 24.

The frame 12 of FIGS. 7-9 has an opening 13 for receiving a number of modules to receive cables or pipes. The compression unit is placed at one end of the opening 13 and a wall 14 projects above the compression unit. The frame 12 has a flange 15 projecting from an upper part of the frame 12 and encircling the opening 13. The opening 13 is formed by means of a wall 17, having the form of an open rectangle. The wall is formed of a framework 18. The wall 17 is perpendicular to the flange 15 and the modules are to be received in the opening 13 formed inside the wall 17. In use the wall 17 is normally placed inside an opening in a partition, such as a wall, and the flange 15 is fixed to the partition outside the opening of the wall. For the fixation of the frame 12 to a partition a number of apertures 16 are arranged at the periphery of the flange 15.

In the wall 14 projecting above the compression unit there are openings to receive the compression screws 24. In the same way as described above the compression screws 24 may co-operate with nuts placed in recesses of the lower compression unit 25. As described above the compression screws 24 go through circular openings in a lower compression wedge 25 and an upper compression wedge. The compression screws 24 are received in slots of a middle compression wedge 26. In this case the fixation means for the frame 12 are not placed in connection with the compression unit. Thus, the compression wedges do not have to be adapted to receive any fixation means and may have a rectangular shape seen in plan view. The compression wedges have slanted surfaces resulting in that the middle compression wedge 26 will be pressed towards the centre of the opening 13 of the frame 12 when the compression screws 24 are tightened. On top of the wall 14 two ribs 35, 36 are arranged parallel with an edge between the wall 14 and the opening 13 of the frame 12. One rib 35 is arranged in connection with the openings for the compression screws 24. The other rib 36 is arranged at the end of the wall 14 and projects a short distance down into the opening 13. The part of the rib 36 projecting into the opening 13 will assist in retaining the compression unit 23 in the space below the wall 14. The ribs 35, 36 are arranged on the upper side of the wall 14, i.e. the opposite side of the compression unit 23.

Figure 10:
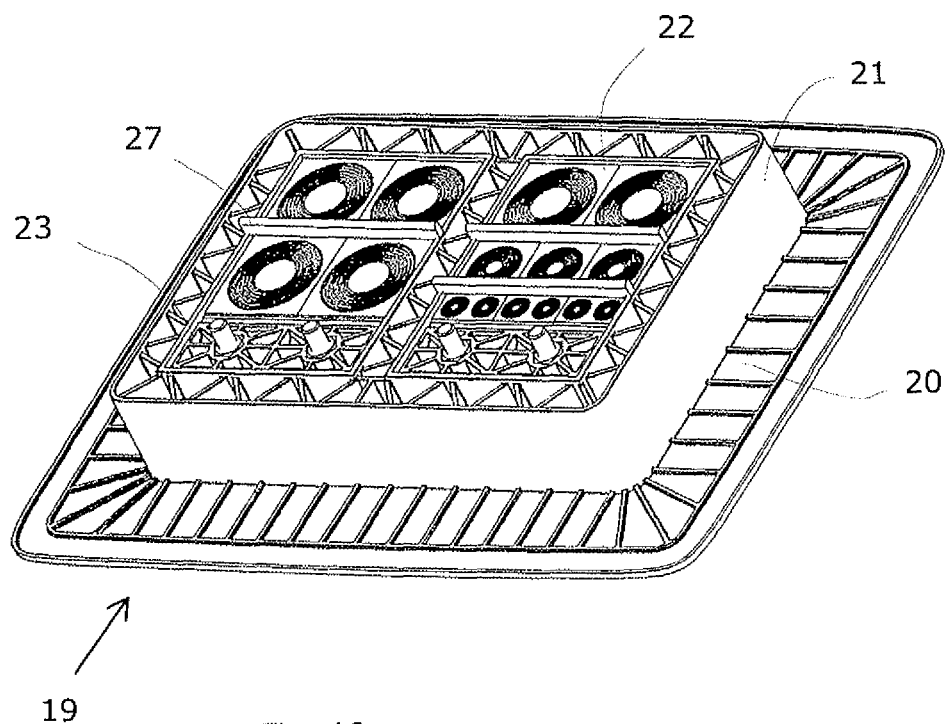
FIG. 10 is a perspective view of yet a further example of a frame according to the present invention, which frame is shown receiving a number of modules for receiving cables or pipes.

The frame 19 of FIG. 10 corresponds with the frame 12 of FIGS. 7-9 except that the frame 19 of FIG. 10 has two openings each including an integrated compression unit 23. Thus, the frame 19 of FIG. 10 has a flange 20 and walls 21, which walls 21 encircle two openings. In FIG. 10 the frame 19 is shown with received modules 22. Between each row of modules a stay plate 27 is arranged. As indicated in FIG. 10 the modules 22 may have different sizes to receive cables or pipes of different diameters. In the shown example the modules 22 are of a type having peelable sheets to adapt an inner diameter of the modules 22 to the outer diameter of the received cable or pipe.

In use, irrespective of which of the above types of frame that is used, the middle compression wedge will be pressed towards the centre of the opening of the frame when the compression screw or screws are tightened, due to the slanted contact surfaces of the compression wedges. Thus, the middle compression wedge will press on the modules inside the opening, which modules are made of an elastic material and will be compressed. By the compression of the modules, the modules will be pressed against a cable or pipe received inside the opening of the frame.

A person skilled in the art realises that the design of the frames may vary. For example in one embodiment the type of frame shown in FIGS. 1-4 has two openings receiving modules.

As indicated above the compression unit 8, 23 is normally manufactured together with the frame 1, 12, 19 in a joint process step. Also a seal may be manufactured in the joint process step, which seal is to seal against a partition in which the frame is received. The frame and integrated compression unit is normally formed by die-casting, but it is also possible to use injection moulding.

The invention claimed is:

1. A frame, comprising:
   an opening to receive one or more modules, the frame forming a transition for cables or pipes together with the modules; and
   a compression unit, as an integrated part of the frame that forms part of the frame, the compression unit being placed in a space under a cover, formed by a portion of the frame, at one end of the opening of the frame, the space being open towards the opening, the compression unit including a lower compression wedge, an upper compression wedge and a middle compression wedge, the upper, lower and middle compression wedges including slanted mutual contact surfaces, the placement of the compression wedges and their slanted mutual contact surfaces being such that in compression the lower and upper compression wedges are moved in direction towards each other, pressing the middle wedge towards the modules inside the frame,
   wherein one or more compression screws are in surface contact with the frame and goes through the cover and each of the upper, lower and middle compression wedges and the frame, whereby the one or more compression screws are received in circular openings of the lower and upper compression wedges and in one or more slots in the middle compression wedge.

2. The frame of claim 1, wherein the lower and upper compression wedges include a common orientation, wherein the middle compression wedge includes a reversed orientation and wherein a relatively broad side of the middle compression wedge is facing the opening of the frame receiving the one or more modules.

3. The frame of claim 1, wherein the lower and upper compression wedges include recesses at opposite sides configured to receive stems of fixation devices of the frame or receiving sleeves for the fixation devices and wherein a portion of the middle compression wedge directed away from the opening of the frame includes a width that is relatively smaller than a distance between the fixation devices or the receiving sleeves.

4. The frame of claim 1, wherein an edge of the frame is arranged at an upper end of the opening to receive the one or more modules, the opening transforming into a relatively smaller opening above the edge, the one or more modules including a dimension hindering them from passing the edge.

5. The frame of claim 1, wherein the cover above the compression unit forms a wall of the frame, the wall including one or more apertures to receive one or more compression screws.

6. The frame of claim 5, wherein the wall includes one or more ribs on a side opposite the compression unit and wherein one of the ribs is placed at a free end of the wall, the one rib projecting down into the opening of the frame.

7. The frame of claim 5, further comprising a flange encircling the opening of the frame receiving the modules.

8. The frame of claim 1, wherein the opening includes at least two openings receiving modules and wherein a compression unit is arranged at each of the at least two openings.

9. A method of manufacturing a frame according to claim 1, comprising:
   manufacturing the frame and an integrated compression unit in a joint process step.

10. The method according to claim 9, wherein a seal of the frame of the frame is manufactured in the joint process step.

11. The method according to claim 9, wherein the process step is die-casting.

12. The method according to claim 10, wherein the process step is die-casting.

13. The frame of claim 1, wherein each of the upper, lower and middle compression wedges has a through-hole, the through-holes being axially aligned with one another, and a compression screw inserted in the axially aligned through-holes.

14. The frame of claim 1, wherein the lower and upper compression wedges include recesses at opposite sides of each of the lower and upper compression wedges that receive fixation devices configured to secure the frame to a mounting surface.

15. The frame of claim 1, wherein the frame includes an edge that extends entirely around the opening and protrudes into the opening thereby reducing the opening from a first dimension to a second dimension smaller than the first dimension.

* * * * *